J. G. STONEBACK.

DAVENPORT.

APPLICATION FILED MAR. 18, 1918.

Reissued May 27, 1919. 14,655.

Inventor:
John G. Stoneback.
By George H. Thorpe
Attorney.

THE NORRIS PETERS CO., PHOTO-LITHO., WASHINGTON, D. C.

UNITED STATES PATENT OFFICE.

JOHN GRANT STONEBACK, OF TOPEKA, KANSAS.

DAVENPORT.

14,655. Specification of Reissued Letters Patent. Reissued May 27, 1919.

Original No. 1,233,419, dated July 17, 1917, Serial No. 141,963, filed January 12, 1917. Application for reissue filed March 18, 1918. Serial No. 223,872.

*To all whom it may concern:*

Be it known that I, JOHN GRANT STONEBACK, a citizen of the United States, residing at Topeka, in the county of Shawnee and State of Kansas, have invented certain new and useful Improvements in Davenports, of which the following is a specification.

My invention relates to improvements in convertible furniture, such for instance as davenports, settees, sofas, etc., and the principal object of my invention is the provision of means whereby such articles of furniture can be quickly converted into a lounge upon which the occupant may recline at full length.

Other objects of the invention will hereinafter appear, and in order that said invention may be fully understood, reference will now be made to the accompanying drawing, in which.

Figure 1:
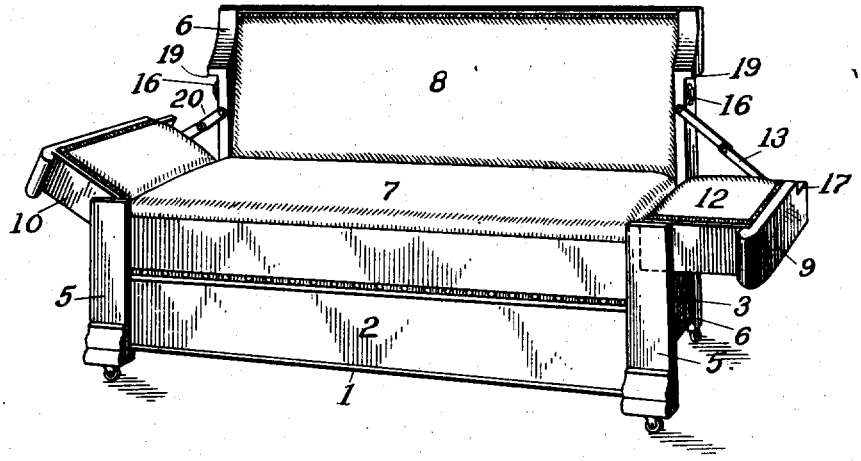
Figure 1 is a perspective view of a davenport constructed in accordance with my invention and arranged in the form of a lounge.

In the drawing which shows the article of furniture in the form of a davenport, 1 designates a frame embodying a front rail 2, end rails 3 and 4, front legs 5, and back legs 6. Said frame 1 supports a seat 7 and a back 8, which are preferably upholstered as shown.

Figure 4:
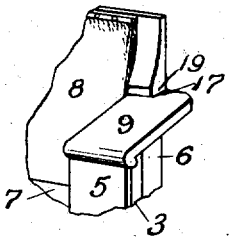
Fig. 4 is a fragmentary perspective view of one end of the davenport.
Figure 5:
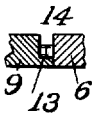
Fig. 5 is a broken sectional view on line V—V of Fig. 3.

9 and 10 designate arms operably-connected by hinges $10^a$ and 11 to the end rails 3 and 4, respectively, the arm 9 being adapted to be lowered from the vertical position disclosed by Fig. 4 to the horizontal position disclosed by Fig. 1, and when so lowered, its upholstered side 12 is on, substantially, the same horizontal plane as the seat 7 and constitutes an extension therefor. When the arm 9 is in lowered position it is supported by the end rail 3 and a foldable link 13, which latter is pivoted at one end to the upper front portion of the adjacent back leg 6 and pivoted at its opposite end to the rear side of the arm 9, which has a pocket 14 to receive said link and hide it from view when the arm is in raised position.

When in raised position, the arm 9 is locked by a catch 15, secured thereto, and a keeper 16 secured to the side of the adjacent back leg 6. The rear end of the top of the arm 9 is notched as indicated at 17 to fit against the side of the leg 6, and beneath a shoulder 19 on said leg, as disclosed by Fig. 4.

Figure 2:
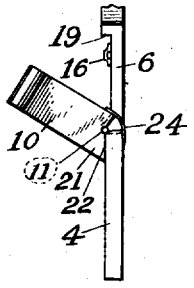
Fig. 2 is an end elevation of one rail and one arm of the davenport.
Figure 3:
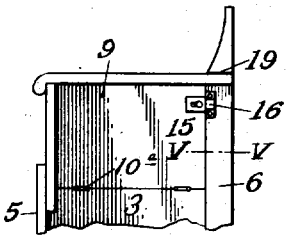
Fig. 3 is a broken side elevation of the davenport.

The arm 10 is similar in construction to the arm 9, it being held in raised position by a catch and keeper 15 and 16 respectively, and in lowered position by a foldable link 20. However, the link 20 is shorter than the link 13, to hold the arm 10 in the inclined position disclosed by Figs. 1 and 2, so that it will constitute a head rest for the occupant of the lounge. The front side of the arm 10 is also different from the front side of the arm 9, in that it has an extension 21 at its lower end, the lower edge 22 of which is on a bias to fit against the outer surface of the rail 4 and thus coact with the link 20 in supporting the arm 10 in inclined position. Short straps 24 are secured to the arms 9 and 10 and the rails 3 and 4, (see Fig. 2) to relieve the hinges $10^a$ and 11 of undue strain in case the foldable links 13 and 20 should work loose from any cause.

From the foregoing description it is apparent that I have produced an article of furniture which can be readily converted from a seat into a lounge having a head rest for the occupant and also a comfortable foot rest, and while I have shown and described the preferred embodiment of the invention, I reserve the right to make such changes in the form, detail construction and organization of parts as properly fall within the spirit and scope of the appended claims.

Having thus described the invention, what I claim as new and desire to secure by Letters Patent, is:

1. In a sofa, a base structure having an end, an arm having a lower edge adapted to seat on the top edge of said end when said arm is vertical, an extension projecting out from and below said lower edge of the arm and having a face angularly related to said lower edge of the arm and formed to seat against the outer face of the sofa end when said arm is in down position, and means to hinge said arm to the sofa end having its pivot located at the juncture of the angular face and the lower edge of the arm.

2. In a sofa, a base structure having an end and a back leg extending above the end, an arm hinged at its lower end to the sofa end, the rear side edge of the arm having a pocket, a pair of pivotally connected links pivoted to said rear side edge of the arm and the back leg and arranged so as to be received in said pocket when the links are folded, and means to hold the arm vertical with the links in said pocket.

3. In a sofa, a base structure having an upwardly-projecting back, an arm hinged to an end of the structure and adapted to project upwardly or longitudinally from the latter, a folding brace pivoted at its opposite ends to the rear part of said arm and the adjacent end of the back; the brace being folded when the arm is upright and the structure having a pocket receiving the brace when folded, and means for holding the arm in its upwardly-projecting position with the brace in said pocket.

In witness whereof I affix my signature.

JOHN GRANT STONEBACK.

Copies of this patent may be obtained for five cents each, by addressing the "Commissioner of Patents, Washington, D. C."